United States Patent
Kaplan

(10) Patent No.: US 12,346,318 B2
(45) Date of Patent: *Jul. 1, 2025

(54) SYSTEM AND METHOD FOR AUTOMATICALLY GENERATING QUESTION AND QUERY PAIRS

(71) Applicant: MeetKai, Inc., Marina Del Rey, CA (US)

(72) Inventor: James Kaplan, Marina Del Rey, CA (US)

(73) Assignee: MEETKAI, INC., Marina Del Rey, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/593,760

(22) Filed: Mar. 1, 2024

(65) Prior Publication Data

US 2024/0296159 A1 Sep. 5, 2024

Related U.S. Application Data

(63) Continuation of application No. 17/494,672, filed on Oct. 5, 2021, now Pat. No. 11,921,712.
(Continued)

(51) Int. Cl.
*G06F 16/242* (2019.01)

(52) U.S. Cl.
CPC ................ *G06F 16/2433* (2019.01)

(58) Field of Classification Search
None
See application file for complete search history.

(56) References Cited

U.S. PATENT DOCUMENTS

| 8,981,962 B2 | 3/2015 | Fu |
| 9,267,518 B2 | 2/2016 | Chang |

(Continued)

FOREIGN PATENT DOCUMENTS

| CN | 110728363 | 1/2020 |
| KR | 10-2002-0030545 | 4/2002 |

(Continued)

OTHER PUBLICATIONS

International Search Report issued Jul. 1, 2021 in corresponding PCT/US2021/021767.
(Continued)

*Primary Examiner* — Thu N Nguyen
(74) *Attorney, Agent, or Firm* — Command IP LLP; Pejman Yedidsion

(57) ABSTRACT

Disclosed is a method and system for automatically generating question and query pair from a knowledge base that involves accessing a knowledge base to extract one or more entities and one or more predicates, generating a baseline question template from a context free grammar rule, inputting the one or more entities and the one or more predicates into the baseline question template to generate a numbered question template, generating a typed question template by traversing the numbered question template through a predicate type-graph, generating a SPARQL query by inputting the one or more entities and the one or more predicates into a SPARQL query template, generating a question by inputting the one or more entities and the one or more predicates into the typed question template, and constructing a question and query pair by combining the question and the SPARQL query.

18 Claims, 7 Drawing Sheets

Related U.S. Application Data

(60) Provisional application No. 63/087,775, filed on Oct. 5, 2020.

(56) References Cited

U.S. PATENT DOCUMENTS

| | | | |
|---|---|---|---|
| 9,607,102 | B2 | 3/2017 | Lavallee et al. |
| 9,654,598 | B1 | 5/2017 | Crawford et al. |
| 9,721,570 | B1 | 8/2017 | Beal et al. |
| 10,156,775 | B2 | 12/2018 | Zimmermann |
| 10,402,460 | B1 | 9/2019 | Jesensky et al. |
| 10,402,589 | B1 | 9/2019 | Madisetti et al. |
| 11,042,369 | B1 | 6/2021 | Kimball |
| 2002/0032591 | A1 | 3/2002 | Mahaffy |
| 2005/0124906 | A1 | 6/2005 | Childre et al. |
| 2007/0043736 | A1 | 2/2007 | Jain |
| 2010/0223295 | A1* | 9/2010 | Stanley ............... G06F 16/284 707/E17.098 |
| 2011/0246496 | A1 | 10/2011 | Hee Sung |
| 2012/0317108 | A1 | 12/2012 | Okazaki |
| 2014/0244712 | A1 | 8/2014 | Walters |
| 2015/0051502 | A1 | 2/2015 | Ross |
| 2015/0106737 | A1 | 4/2015 | Montoy-Wilson et al. |
| 2015/0199010 | A1 | 7/2015 | Coleman et al. |
| 2015/0288857 | A1 | 10/2015 | Fay et al. |
| 2015/0339590 | A1 | 11/2015 | Maarek |
| 2015/0351655 | A1 | 12/2015 | Coleman |
| 2016/0292358 | A1* | 10/2016 | Heger ................ G16H 70/20 |
| 2017/0039291 | A1 | 2/2017 | Singh et al. |
| 2017/0046124 | A1 | 2/2017 | Nostrant |
| 2017/0092270 | A1 | 3/2017 | Newendorp et al. |
| 2017/0206797 | A1 | 7/2017 | Solomon |
| 2017/0333666 | A1 | 11/2017 | Goldberg et al. |
| 2017/0357637 | A1 | 12/2017 | Nell et al. |
| 2017/0357910 | A1 | 12/2017 | Sommer et al. |
| 2018/0011903 | A1 | 1/2018 | Abolhassani et al. |
| 2018/0054228 | A1 | 2/2018 | Lin |
| 2018/0075145 | A1 | 3/2018 | Zhao et al. |
| 2018/0089410 | A1 | 3/2018 | Caso |
| 2018/0096678 | A1 | 4/2018 | Zhou et al. |
| 2018/0159889 | A1 | 6/2018 | Sjouwerman |
| 2018/0213037 | A1 | 7/2018 | Roman |
| 2018/0232920 | A1 | 8/2018 | Faulkner et al. |
| 2018/0242149 | A1 | 8/2018 | Verma |
| 2018/0262391 | A1 | 9/2018 | Jng |
| 2018/0300679 | A1 | 10/2018 | Mahmood |
| 2018/0315499 | A1 | 11/2018 | Appelbaum |
| 2018/0337875 | A1 | 11/2018 | Friio |
| 2018/0374474 | A1 | 12/2018 | Wang |
| 2019/0035396 | A1 | 1/2019 | Adamski |
| 2019/0042955 | A1 | 2/2019 | Cahill et al. |
| 2019/0083034 | A1 | 3/2019 | Shim et al. |
| 2019/0122121 | A1 | 4/2019 | Yu |
| 2019/0155566 | A1 | 5/2019 | Dory |
| 2019/0215673 | A1 | 7/2019 | Choi |
| 2019/0354599 | A1 | 11/2019 | Mital |
| 2019/0385606 | A1 | 12/2019 | Won |
| 2020/0092519 | A1 | 3/2020 | Shin et al. |
| 2020/0110835 | A1* | 4/2020 | Zhao ..................... G06N 5/022 |
| 2020/0125600 | A1 | 4/2020 | Jo |
| 2020/0242146 | A1 | 7/2020 | Kalukin |
| 2020/0243082 | A1 | 7/2020 | Yoshida |
| 2020/0327431 | A1 | 10/2020 | Woo |
| 2020/0335102 | A1 | 10/2020 | Lefkofsky |
| 2020/0342968 | A1 | 10/2020 | Avinash |
| 2020/0402502 | A1 | 12/2020 | Hanes |
| 2021/0011887 | A1 | 1/2021 | Visser |
| 2021/0011933 | A1 | 1/2021 | Liu |
| 2021/0049827 | A1 | 2/2021 | Lebaredian |
| 2021/0056753 | A1 | 2/2021 | Yasar |
| 2021/0201174 | A1 | 7/2021 | Huang |
| 2021/0297494 | A1 | 9/2021 | Kaplan |
| 2021/0304020 | A1 | 9/2021 | Kaplan |
| 2021/0366473 | A1 | 11/2021 | Maeng |
| 2021/0398671 | A1 | 12/2021 | Gnanasambandam |
| 2022/0043845 | A1* | 2/2022 | Sun ..................... G06F 16/332 |

FOREIGN PATENT DOCUMENTS

| | | |
|---|---|---|
| KR | 10-0978740 | 3/2018 |
| KR | 10-2018-0050771 | 5/2018 |
| KR | 10-1854284 | 5/2018 |
| KR | 10-2018-0096183 | 8/2018 |
| KR | 10-2019-0080834 | 7/2019 |
| KR | 1020190094307 | 8/2019 |
| KR | 20190106269 | 9/2019 |
| WO | WO 2019/172946 | 9/2019 |
| WO | WO 2019/183062 | 9/2019 |

OTHER PUBLICATIONS

International Search Report issued Jul. 9, 2021 in corresponding PCT/US2021/022827.

International Search Report issued Jul. 9, 2021 in corresponding PCT/US2021/024515.

International Search Report issued Jul. 19, 2021 in corresponding PCT/US2021/024720.

International Search Report issued Jul. 20, 2021 in corresponding PCT/US2021/024994.

International Search Report issued Aug. 9, 2021 in corresponding PCT/US2021/029472.

International Search Report issued Oct. 13, 2021 in corresponding PCT/US2021/038266.

International Search Report issued Jan. 20, 2022 in corresponding PCT/US2021/053646.

* cited by examiner

SYSTEM AND METHOD FOR AUTOMATICALLY GENERATING QUESTION AND QUERY PAIRS

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Disclosed herein is a method and apparatus for generating question/query pairs with as little human input as possible. The question in a question/query pair is a natural language question, defining the question in natural language or ordinary language (i.e., any language that has evolved naturally in humans through use and repetition). The query in a question/query pair is written in the form of a formal language (such as a query language or otherwise) such that it is readable by a computer. Question/query pairs are used in machine learning to train AI modules and software applications to accurately translate queries into questions, and vice versa. Such training typically requires a large sample size of question/query pairs—the larger a sample size, the more effective training may be. The disclosed method and apparatus present an automated process for generating such large sample sizes. Aside from a short initial configuration task, the disclosed method and apparatus for generating question/query pairs may not require any further human input.

WikiData is leveraged, a knowledge base of RDF triple-stores, as a source for generating the main content of questions and queries. Using multiple layers of question templating, some of the most challenging parts of crafting queries that have been handled by humans in previous papers, are sidestepped. The disclosed system is easily configurable to multiple domains and can be modified to generate queries in natural languages other than English. Also presented is an example dataset of 110,000 question/query pairs across four WikiData domains. Additionally presented is a baseline model trained on the dataset which can be used for its application to a commercial QA setting.

This method and apparatus differ notably from previous approaches to text2sparql datasets in that it takes a fully generative approach to the creation of the dataset. Even with an entirely automated dataset construction, the system is able to achieve high user satisfaction on a commercial QA system trained on the generated dataset. Disclosed is a modular framework for the construction of text2sparql datasets, a sample dataset to serve as a standard starting point, and a baseline model to demonstrate utilizing state of the art techniques to perform the KGQA task itself.

Figure 1:
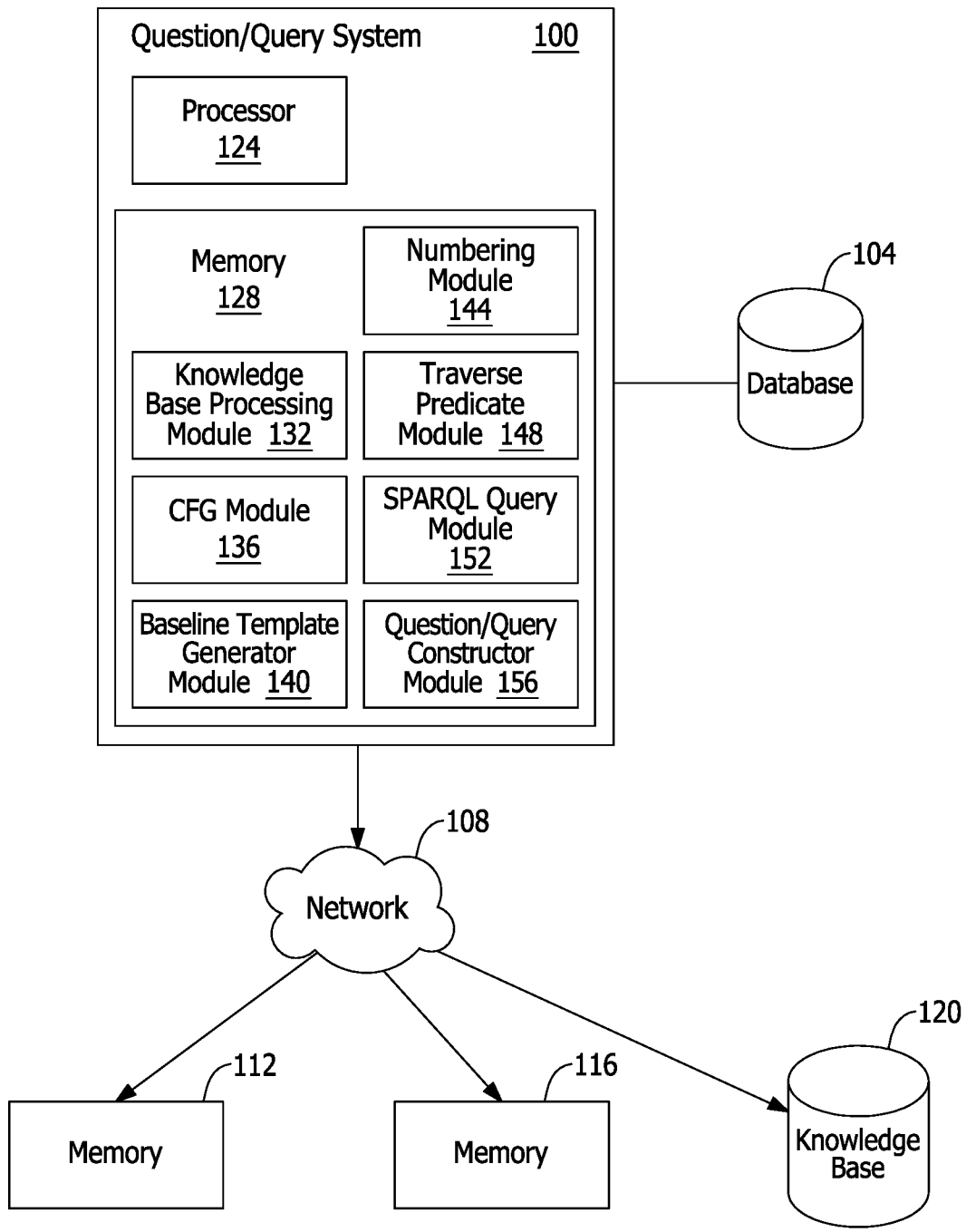
FIG. 1 illustrates an exemplary automatic question/query pair generating system.

FIG. 1 illustrates an exemplary automatic question/query pair generating system. In FIG. 1, the automatic question/query pair generating system 100 may be connected to a database 104 via one or more wired or wireless connections, and may be connected to external sources via a network 108 (such as a local area network, a wide area network, a personal area network, the Internet, an ethernet, a Wi-Fi connection, or any other wired or wireless connections). External sources may include one or more user devices 112 (such as a smartphone, tablet, computer, or any other type of electronic computing device), software 116 operating on user devices, servers, or cloud, and knowledge bases 120. A knowledge base may be any database storing information. In one embodiment, the automatic question/query pair generating system 100 may use WikiData as its primary knowledge base 120. WikiData is a knowledge base that acts as central storage for structured data of Wikimedia projects including Wikipedia, Wikivoyage, Wikionary, Wikisource, etc. Any knowledge base may be used.

The automatic question/query pair generating system 100 may include a processor 124 configured to run machine executable code, a memory 128 storing non-transitory machine executable code, which may include one or more of the following modules. A knowledge base processing module 132 may be configured to process knowledge bases 120 into entities (such as objects, defined and discussed in more details below) and predicates (such as relations, defined and discussed in more details below).

A context free grammar ("CFG") module 136 may be configured to generate grammar rules (defined and discussed below), which form the baseline for generating questions. A baseline template generator module 140 may be configured to generate baseline question templates (defined and discussed below) using the grammar rules. A numbering module 144 may be configured to generate numbered question templates (defined and discussed below) using the baseline question templates. A traverse predicate module 148 may be configured to generate typed question templates (defined and discussed below) using the numbered question templates. A SPARQL query module 152 may be configured to generate computer language rules (defined and discussed below). A question/query constructor module 156 configured to generate question/query pairs by generating questions based on use of entities and predicates in numbered question templates, and by generating queries based on use of formal grammar.

In other words, a knowledge base may be processed into smaller data types. Question templates may be created based on grammar rules, and the smaller data types from the knowledge base may be automatically fed into the question templates to generate numerous questions. Simultaneously, computer language rules may be created using SPARQL queries and the same grammar rules, and the smaller data types from the knowledge base may be automatically fed into the question templates to generate numerous queries. Questions and queries using the same entities and/or predicates may be considered a question/query pair, such that one may be translated into the other, and vice versa. These question/query pairs may then be used to train AI modules or software applications to perform accurate translations in either direction.

Figure 2:
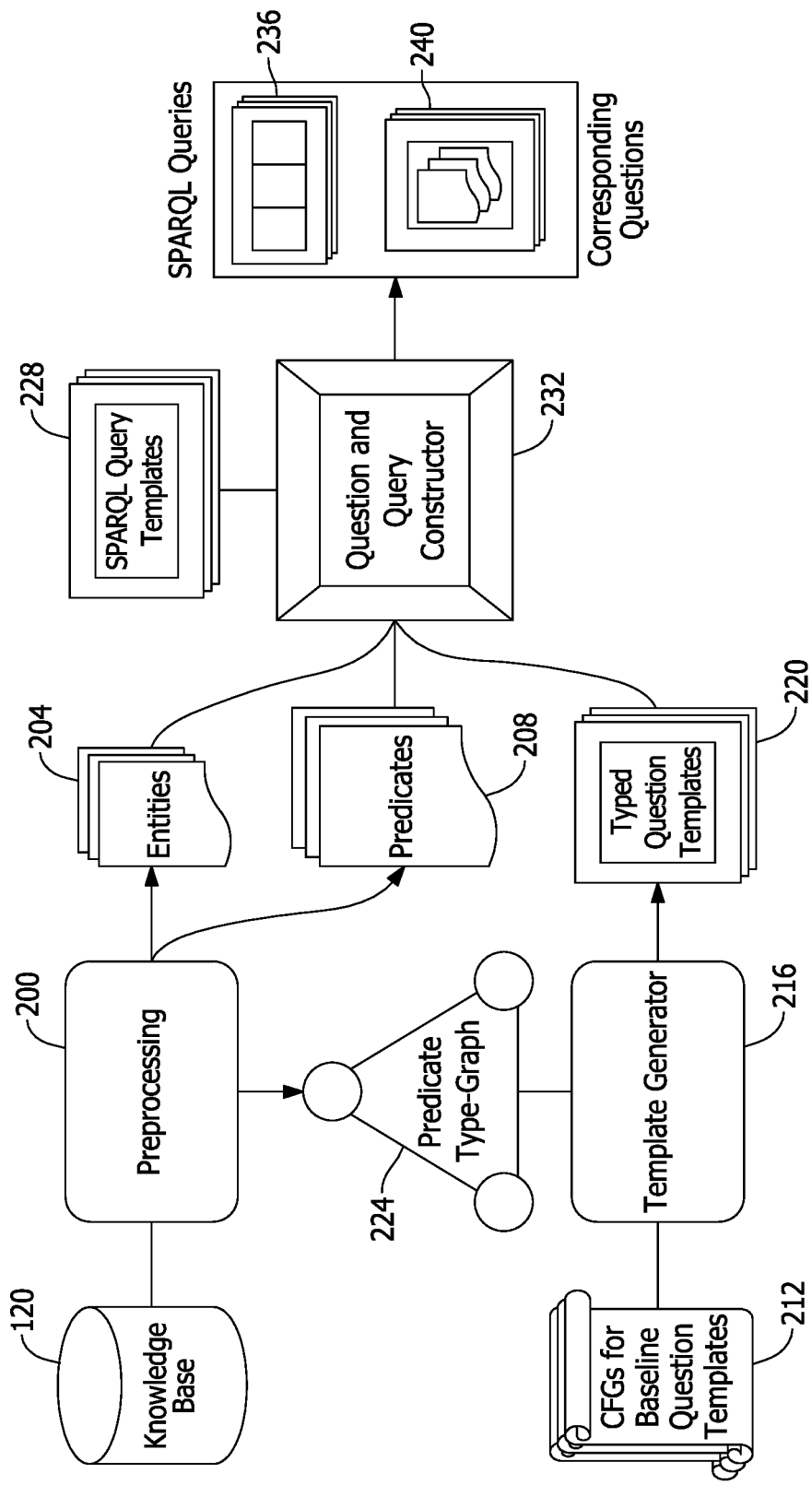
FIG. 2 illustrates a block diagram of the interrelation between various modules and a knowledge base.

FIG. 2 illustrates a block diagram of the interrelation between various modules and a knowledge base. In FIG. 2, a knowledge base 120 undergoes processing at step 200 to generate entities 204 and predicates 208 based on the related data in the knowledge base. Entities may refer to real-world objects (such as a person, location, organization, product, etc.) that can be denoted with a name. Such objects may be abstract or have a physical existence. A predicate asserts a property, action, or condition of the entity in relation to other entities. A knowledge base is defined in terms of entities and predicates relating between entities.

In some knowledge bases such as WikiData, entities and predicates are already identified (such as appending an entity or a predicate tag to data). For such knowledge bases, the processing step 200 may involve extracting data identified as entities and/or predicates. In other knowledge bases, where entities and predicates are not identified, the processing step 200 may involve additional steps such as fusing with other knowledge bases (such as WikiData) to identify data as entities and predicates. For example, where person A is identified as the mother of person B, using reflexive rules, person B may, in turn, be identified as the child of person A.

Separately, CFG (context free grammar) rules may be created 212. In formal language theory, a CFG is a formal grammar whose production rules are of the form A□α, with A being a single nonterminal symbol, and α being a string of terminals and/or nonterminals (α can be empty). A formal grammar is "context free" if its production rules can be applied regardless of the context of a nonterminal. No matter which symbols surround it, the single nonterminal on the left-hand side can always be replaced by the right-hand side.

CFG rules have had widespread use in classical linguistics and computer science for the formal definition of context free languages. They are utilized to formally define each question type that is covered in the dataset. The utilization of a CFG rule for question templates allows us to make use of their intrinsically recursive nature to generate deeply nested queries.

The CFG rules 212 may be processed by one or more template generator modules 216 (further illustrated in FIG. 3 and discussed more below) into baseline question templates (which are question templates that are context free, such that any entities and/or predicates may be inserted into the template), then typed question templates 220 (which are question templates where context is injected, such that certain entities and/or predicates may not be inserted into the template, to avoid nonsensical questions).

Specifically, the template generator 216 may add additional constraints to templates to facilitate easy SPARQL generation and to control for possible semantic infelicity. For example, the template generator 216 may number the predicates in the baseline templates with the nesting order that they would take in their logical form.

Data is often organized in layers (referred to as nesting). In the context of an entity, for example, one type of visual artwork (first layer) may be a film (second layer), but other second layer categories (such as a painting) may also fall under the first layer, such that a visual artwork need not be a film. Based on proper nesting order, a question template where the category of visual artwork encompasses all films would be logical, but a question template where the film category encompasses all visual artworks would not be logical. This process is further illustrated in FIG. 3 and discussed more below.

In a separate step, SPARQL query templates 228 may be created. As discussed above, SPARQL is the standard query language and protocol for LOD or for RDF triplestores. It allows a model to query over a "knowledge graph" instead of a traditional relational database. Such queries may typically be used to filter a larger set of data into a smaller set of data based on matching qualities. For example, in a large dataset of transportation vehicles, smaller datasets may be identified through querying the type of vehicles. For example, a query for two-wheeled vehicles may yield a smaller dataset of motorcycles and bikes. A further query for electric, two-wheeled vehicles may yield an even smaller database of just motorcycles.

SPARQL query template creation may be similar to LC-QuAD 2.0, which presented a framework for leveraging crowdsourcing via Amazon Mechanical Turk in order to create a dataset of paired English questions and SPARQL queries. Adopting the principles of the LC-QuAD 2.0 framework, ten distinct types of questions are contemplated:

1. Single Fact
2. Single Fact with Type
3. Multi Fact
4. Fact with Qualifiers
5. Two Intention
6. Boolean
7. Count
8. Ranking
9. String Operation
10. Temporal Aspect The SPARQL query templates improve on the above-discussed framework by using a more succinct list that is more amenable towards automated dataset generation, which may include the following:

1. Single-Entity (Single Fact, Single Fact with Type, Multi Fact, Fact with Qualifiers)
2. Multi-Entity (Boolean)
3. Count
4. Two Intention
5. Ranking
6. Filtering (String Operation, Temporal Aspect)

These six question types correspond to the types of questions commonly used to filter larger datasets into smaller datasets. "Single-entity" questions may involve a single entity and ask for another entity that has some specific relationship to that entity. For example, "Billie Jean was on the track list of which studio album?" may be a single-entity-type question.

"Multi-entity" questions may mention two or more entities, and ask if some specific relationship between them exists. For example, "did Breaking Bad have 5 seasons?" may be a multi-entity-type question.

"Count" questions may mention a single entity and ask how many other entities are related in some specific way to that entity. For example, "what is the number of siblings of Edward III of England?" may be a count type question.

"Two intention" questions ask for a result in relation to two entities. For example, "when and where did Barack Obama get married to Michelle Obama?" may be a two intention-type question.

"Ranking" questions are related to the task of ranking items by some property. For example, "what is the binary star which has the highest color index?" may be a ranking-type question.

"Filtering" questions collect a set, and then exclude or include only those entities matching some predicates. For example, "give me all rock bands that start with letter R" or "with whom did Barack Obama get married in 1992?" may be filtering-type questions.

The above-listed relationships may consist of multiple relations or predicates from the knowledge base 120. Each question type may correspond to a different basic SPARQL query template.

Additional query types regarding the properties of an RDF triplestores may be added. These questions may return qualifiers in WikiData but may have different names in different knowledge bases. Qualifiers typically encompass a different set of information than properties but may require a different set of syntax to access.

Nesting order for the numbered predicates in the baseline templates (discussed above) may have the same ordering as the predicates order in the corresponding SPARQL query. In other words, the same nesting order used to generate typed question templates may be used to generate SPARQL query templates. Thus, queries generated by the SPARQL query templates 228 apply the same grammar and language rules as questions generated by the typed question templates 220 to ensure questions and queries are properly paired.

Entities 204, predicates 208, typed question templates 220, and SPARQL query templates 228 may then be combined into a question and query constructor 232 to generate SPARQL queries 236 and corresponding questions 240. For example, entity A, B, and predicate X may be combined with a first typed question template to generate a first question. A, B, and X may also be combined with a first SPARQL query template to generate a first query. Because the first question and the first query use the same grammar and language rules (as discussed above) and the entities (A, B) and predicates (X), the first question and the first query may be properly considered a question/query pair.

As further examples, the following SPARQL query templates may be created:

| SPARQL Query Type | Question 240 | SPARQL Query 236 |
| --- | --- | --- |
| Single-Entity | Who is the mother of the director of Pulp Fiction? | SELECT ?end WHERE { [ Pulp Fiction ] wdt:P5 / wdt:P25 ?end . } |
| Multi-Entity | Is John Steinbeck the author of Green Eggs and Ham? | ASK { BIND ( [ John Steinbeck ] as ?end ) . [ Green Eggs and Ham ] wdt:P50 ?end . } |
| Count | How many awards does the producer of Fast and Furious have? | SELECT ( COUNT ( DISTINCT ?end ) as ?endcount ) WHERE { [ Fast and Furious ] wdt:P162 / wdt:P166 ?end . } |

The resulting question/query pairs may then be used to train AI modules or software applications to accurately translate a query into question, and vice versa.

Figure 3:
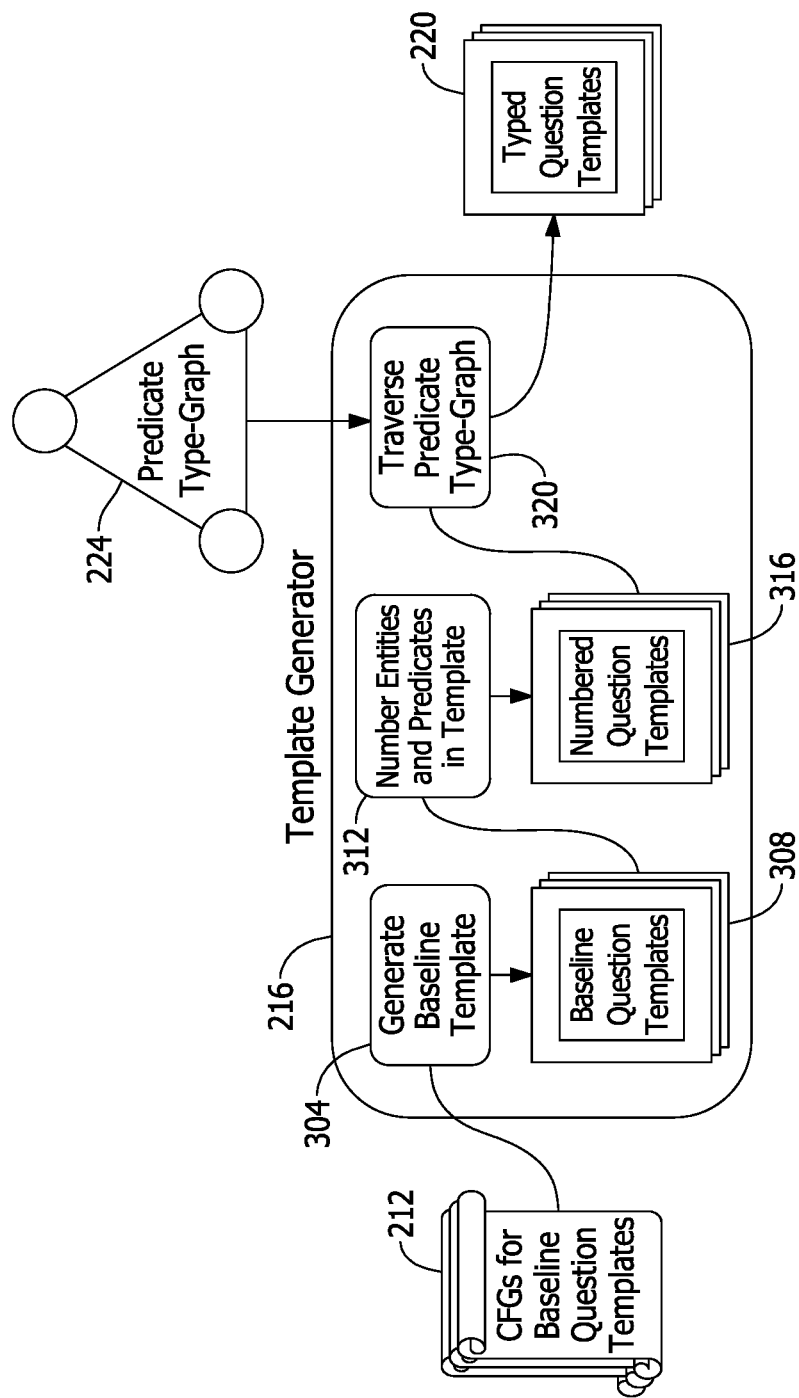
FIG. 3 illustrates a block diagram of the interrelation between various modules inside a template generator

FIG. 3 illustrates a block diagram of the interrelation between various modules inside a template generator (illustrated as 216 in FIG. 2 and described above). The template generator 216 may be responsible for generating semantically-aware templates that have predicates numbered by their expected order in a SPARQL query. Specifically, in FIG. 3, the initial CFG rules (illustrated as element 212 in FIG. 2 and described above) are processed at step 304 to generate baseline question templates 308. For example, a single-entity type CFG rule may be:
S→"[WH]" IS Q "?"
IS→"is"|"was"
Q→NOUN|VERB-ADP
NOUN→"[THING]"|NOUN "'s [NOUN]"|"the [NOUN] of" NOUN VERB-ADP→NOUN "[VERB-ADP]"
Based on this single-entity CFG, a single-entity baseline template may be "[WH] was the [NOUN] of [THING]'s [NOUN]?" In this example, "[WH]" may represent a question such as what, where, when, etc., and "[NOUN]" may represent predicates. "[THING]" may represent entities. Using an example referenced above, the question "who is the mother of the director of Pulp Fiction?" may be written in the baseline template as "[who] was the [mother] of [Pulp Fiction]'s [director]?"

Below is an example of a multi-entity type CFG rule:
S→IS NOUN "[SEP] the [NOUN] of" NOUN "?"
is→"is"|"was"
IS→"Is"|"Was"
NOUN→"[THING]"|NOUN "'s [NOUN]"|"the [NOUN] of" NOUN Below is an example of a count type CFG rule:
S→"[WH]" IS Q "?"|"How many [NOUN] does" NOUN "have?"
CAN→"Hey"|"Can you tell me"|"Do you know"
IS→"is"|"was"
Q→"the number of [NOUN] of" NOUN
NOUN→"[THING]"|NOUN "'s [NOUN]"|"the [NOUN] of" NOUN The baseline question templates 308 may then be used to number entities and predicates 312. As discussed above, entities 204 and predicates 208 may be extracted from a knowledge base 120. In a baseline question template, any entity 204 and any predicate 208 may be used in any location. Using the single-question type example above, a baseline template of "[WH] was the [NOUN] of [THING]'s [NOUN]?" may also be written into the question "who is the director of the mother of Pulp Fiction?" However, this sentence would not make sense. By numbering entities and/or predicates, additional constraints may be added to the template to eliminate such non-sensical questions (identified as questions with illegal values). This may involve running grammar checking tools to analyze grammar of generated questions. Questions that have bad grammar are likely non-related. The resulting template may be referred to as numbered question templates 316.

Numbered question templates 316 may be used to traverse 320 predicate type-graph 224. Graph traversal (also known as graph search) refers to the process of vising/checking/updated each vertex in a graph. Motivated by concepts in first-order-logic, this traversal turns each predicate into a function from one ontological type to another. An ontological type is a category of properties. For example, the predicate "narrative location" is the geographic location used in a narrative. The narrative may be from the following ontological types: book, a short story, a film, or a television series. Thus, upon traversal of a predicate type-graph, the predicate "narrative location" may become, among others, a function from television series to location.

To enforce semantic felicity, it is necessary to ensure that the entities and predicates in the question have semantic types that correspond correctly. During the preprocessing phase each predicate may be labeled with its ontological function type. In some knowledge bases this step might be done already. Each chain of predicates in a question may satisfy the following conditions in order to be semantically felicitous: First, each predicate in the predicate chain may take as an argument the type of entity that is output by the previous predicate. Second, the first predicate may take as an argument the type of the entity in the main entity slot of the template.

The construction of these chains may be carried out through the use of a predicate graph 224. In a preferred embodiment, the predicate type graph 224 may be created based on WikiData, but it is contemplated that predicate type graphs may be extended to any knowledge base. The predicate graph 224 may be best understood in the context of the "single-entity" templates. The path may begin in the graph at the randomly selected entity type node and make random traversals until the path reaches a length specified by the template. The predicates in the template may be labeled with the ontological types stored in the edges of the path. These labeled predicates may be independently sampled downstream during the question and query construction phase (discussed below), without any risk of compromising the semantic felicity of the generated questions.

By separating legal paths (such as the path between two nodes in a predicate-type graph) from illegal paths (which may be paths that do not exist between two nodes in a predicate-type graph), predicate type graphs may be used to determine which templates may be linguistically legal (in other words, questions that make sense) and not legal (in other words, questions that do not make any sense). This traversal may result in templates with legal paths, referred to as typed question templates 220. 'Legal' and 'Illegal' paths are defined if they conform to the requirements prescribed by each edge of the graph.

In simple terms, by traversing the numbered question templates 316 through predicate type graphs 224, the resulting typed question template 220 may be in a form that mirrors RDF triplestores more closely. As discussed above, data in an RDF database is stored in RDF triplestores format, a type of graph database that stores data as a network of objects, and uses inference to uncover new information out of existing relations. The typed question templates 220 are predicate type-graph question templates that mirror the graph format of RDF databases.

Figure 4:
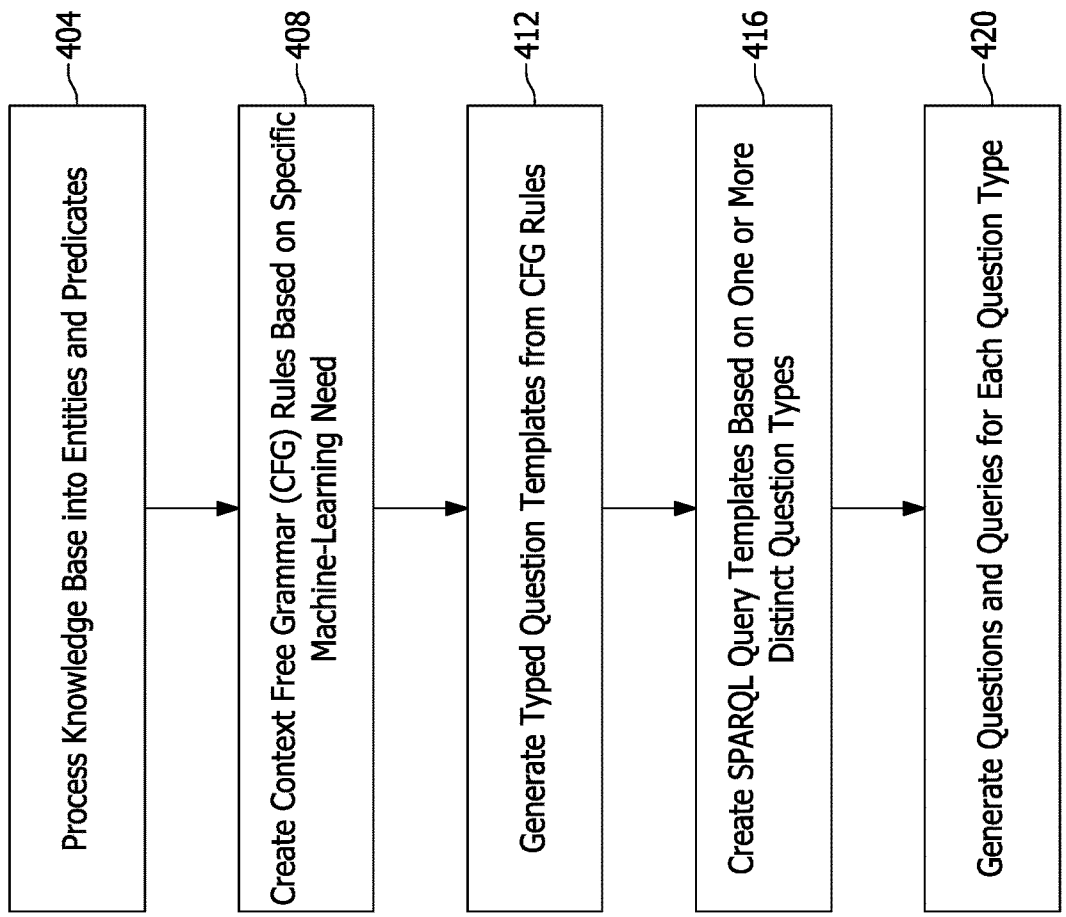
FIG. 4 is a flowchart of a sample process of generating question/query pairs from a knowledge base.

FIG. 4 is a flowchart of a sample process of generating question/query pairs from a knowledge base. At a step 404, a knowledge base is processed into entities and predicates (as illustrated in FIG. 2, items 120, 200, 204, 208, and as discussed above). For example, a weather software application may involve a voice-assistant feature to permit a user to search for weather condition using voice commands. In order to train this voice-assistant feature, user questions such as "what is the weather in Berlin?" or "will it be sunny tomorrow?" may be desired to train the voice assist to generated accurate answers to future user inquiries. Entities may include locations, and predicates may include dates and specific weather characteristics. Such entities and predicates may be isolated from a knowledge base, which for weather will change over time, but some data is constant, such as location and types of weather events.

At a step 408, CFG rules are created based on specific machine-learning need (as illustrated in FIG. 2, item 212, and as discussed above). Using the weather software application example above, CFG rules may be created to anticipate various structures of possible questions. At a step 412, typed question templates may be generated from CFG rules (as illustrated in FIG. 2, items 212, 216, 220 and FIG. 3, generally). This step is further illustrated in FIG. 5 and discussed in more details below. At a step 416, one or more question types may be selected. This is done through probabilistic methods based on desired use cases that are to be supported downstream. Using the weather software application example above, desirable question types may include single-entity (for questions such as "what is the weather in Berlin?"), multi-entity (for questions such as "is New York colder than New Jersey?"), and count (for questions such as "how many more days of snow are we getting?"). Based on these three desirable question types, SPARQL query templates may be created. The SPARQL query templates are used to generate queries for the question/query pairs.

Figure 5:
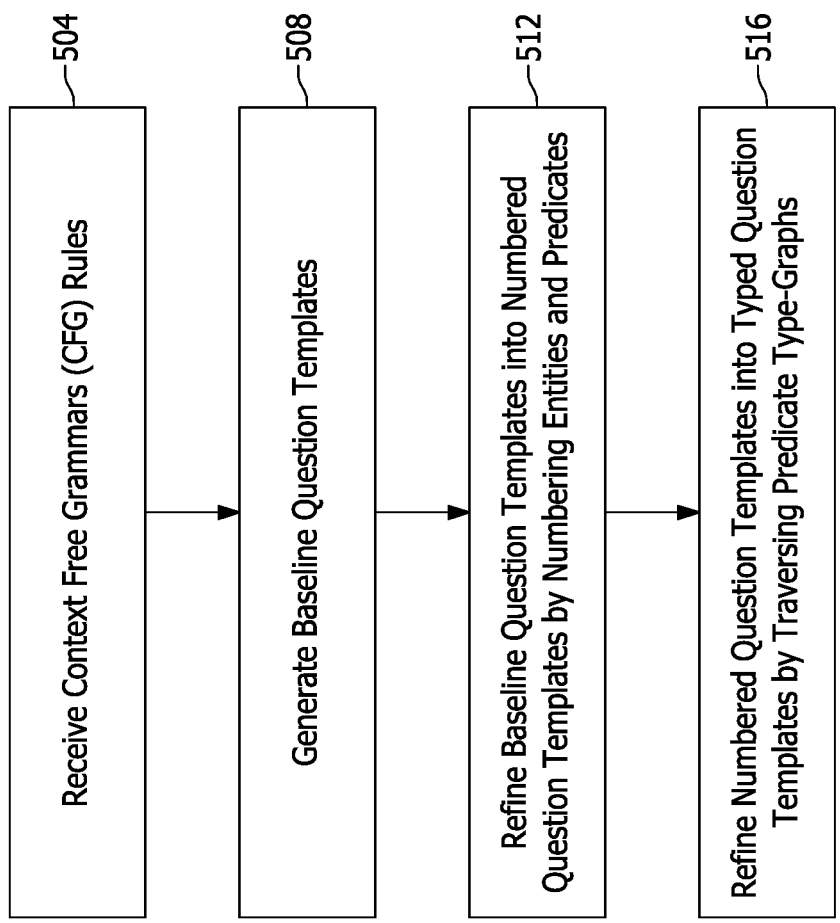
FIG. 5 is a flowchart of a sample process of typed question templates from CFG rules.

At a step 420, SPARQL query templates may be combined with isolated entities and predicates from step 404 to generate queries. As discussed above, a query may be a question in computer-readable format that may be used in conjunction with an external database to retrieve an answer. Typed question templates may be combined with isolated entities and predicates from step 404 to generate questions. As discussed above, questions may be in natural language, and/or written as if a human were to ask another human a question (as opposed to a query, which may be in computer-readable format). Queries and questions corresponding to the same desired answer form question/query pairs FIG. 5 is a flowchart of a sample process of typed question templates from CFG rules. At a step 504, CFG rules are created as discussed in step 408 of FIG. 4. At a step 508, baseline question templates may be created (as illustrated in FIG. 3, items 212, 304, 308, and as discussed above). At a step 512, entities and predicates are numbered (or with any other method or scheme) to eliminate nonsensical questions, and such numbers are used to refine baseline question templates into numbered question templates (as illustrated in FIG. 3, items 308, 312, 316, and as discussed above). At a step 516, predicate type-graphs are used to refine numbered question templates into typed question templates (as illustrated in FIG. 3, items 224, 316, 320, 220, and as discussed above). Typed question templates may then be used to generate questions for question/query pairs.

The following examples demonstrate steps 508-516:
a. Generate baseline question templates:
   i. Example 1: [WH] is the [NOUN] of [THING] [VERB-ADP] ?
   ii. Example 2: Is the [NOUN] of [THING] [SEP] the [NOUN] of the [NOUN] of [THING] ?
   iii. Example 3: How many [NOUN] does the [NOUN] of the [NOUN] of [THING] have?
b. Generate numbered question templates by updating baseline question templates with numbering:
   i. Based on Example (a)(1): ('[WH] is the [NOUN:A:0] of [THING:A] [VERB-ADP:A:1]?', [2])
   ii. Based on Example (a)(2): ('Is the [NOUN:A:0] of [THING:A] the [NOUN:B:1] of the [NOUN:B:0] of [THING:B]?', [1, 2])
   iii. Based on Example (a)(3): ('How many [NOUN:A: 2] does the [NOUN:A:1] of the [NOUN:A:0] of [THING:A] have?', [3])
c. Generate typed question templates by updating numbered question templates with predicate-type graphs:
   i. Based on Example (b)(1): ('What is the [literary_work→person:NOUN:A:0] of [literary_work:A] [person→gender: VERB-ADP:A:1]?', [2])
   ii. Based on Example (b)(2): ('Is the [literary_work→location:NOUN:A:0] of [literary_work:A] the [person→location: NOUN:B:1] of the [television_series→person:NOUN:B:0] of [television_series:B]?', [1,2])
   iii. Based on Example (b)(3): ('How many [person→thing:NOUN:A:2] does the [person→person:NOUN:A:1] of the [literary_work→person: NOUN:A:0] of [literary_work:A] have?', [3])

In step c above, a "THING" is used to generate the remaining elements of the question. For example, in step (c)(i), the "THING" is "literary_work". Based on a possible predicate that a literary work is created by a person, "NOUN A:0" may be identified as "literary_work→person". Then, based on a possible predicate that a person has a gender, "VERB-ADP:A:1" may be identified as "person→gender".

The following example demonstrate steps 508-516, and the resulting question/query pair (illustrated as step 420 in FIG. 4):
d. Generate a baseline question template:
   [WH] is the [NOUN] of the [NOUN] of [THING] ?
e. Generate a numbered question template:
   ('[WH] is the [NOUN:A:1] of the [NOUN:A:0] of [THING:A]?', [2])
f. Generate a typed question template:
   ('What is the [person→race:NOUN:A:1] of the [television_series→person:NOUN:A:0] of [television_series:A]?', [2]>
g. Generate question/query pairs by filling the typed question templates with random entities and predicate items:
   ("What is the ethnicity of the film crew member of America's Next Top Model?", "SELECT?end WHERE {[America's Next Top Model] wdt:P3092/wdt:P172 ?end.}", 'b2f28747abf50c608802c85ba59e3ebf6008a9e4')

Figure 6:
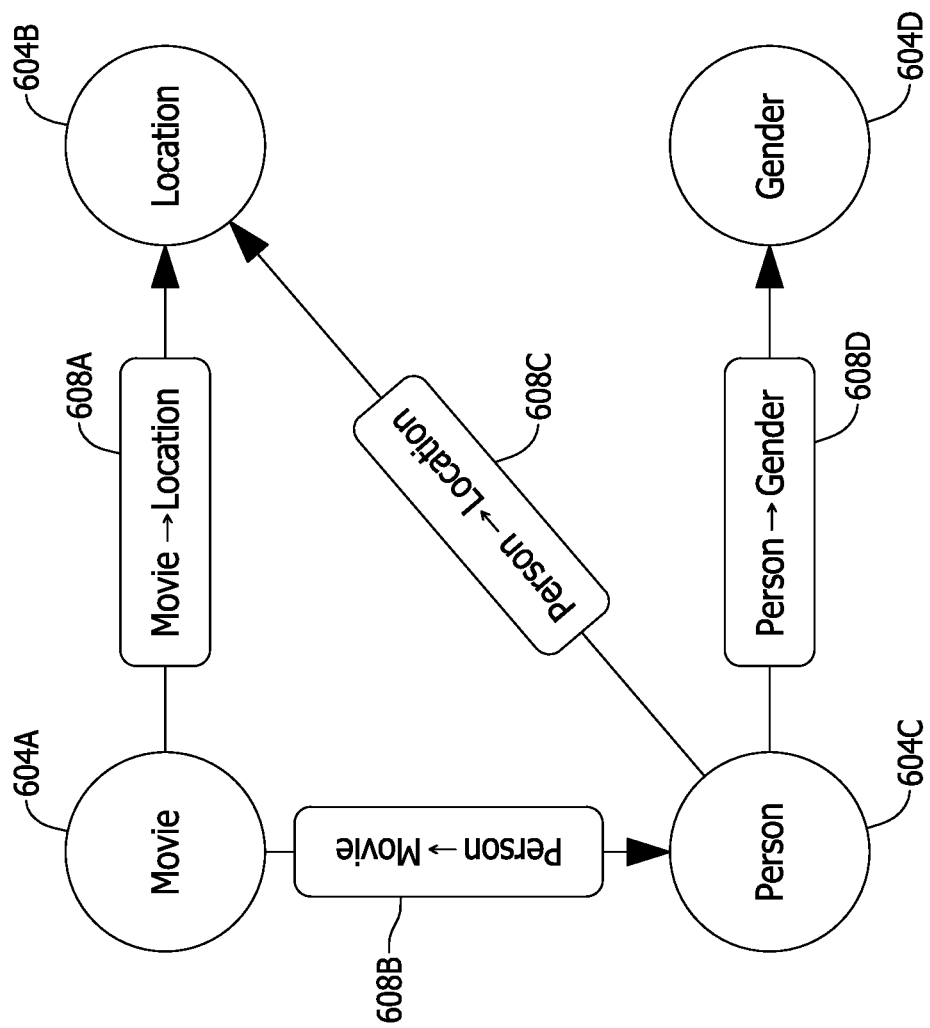
FIG. 6 is an exemplary predicate type-graph for single-entity and count queries.

FIG. 6 is an exemplary predicate type-graph for single-entity and count queries. The edges of this graph may be one or more predicates 604, while paths 608 are formed between each predicate 604. For single-entity and count queries, uni-directional traversals of a specified length will yield paths with edges 608 that are the ontological type of the required predicate 604. For multi-entity query types, bi-directional traversal may be performed on the graph, such that one or more paths may be traversed in inverse directions. This is required in order to support questions that may be asked in an opposite fashion ("Michele Obama is the wife of Barack Obama" versus "Barack Obama is the husband of Michele Obama".

Figure 7:
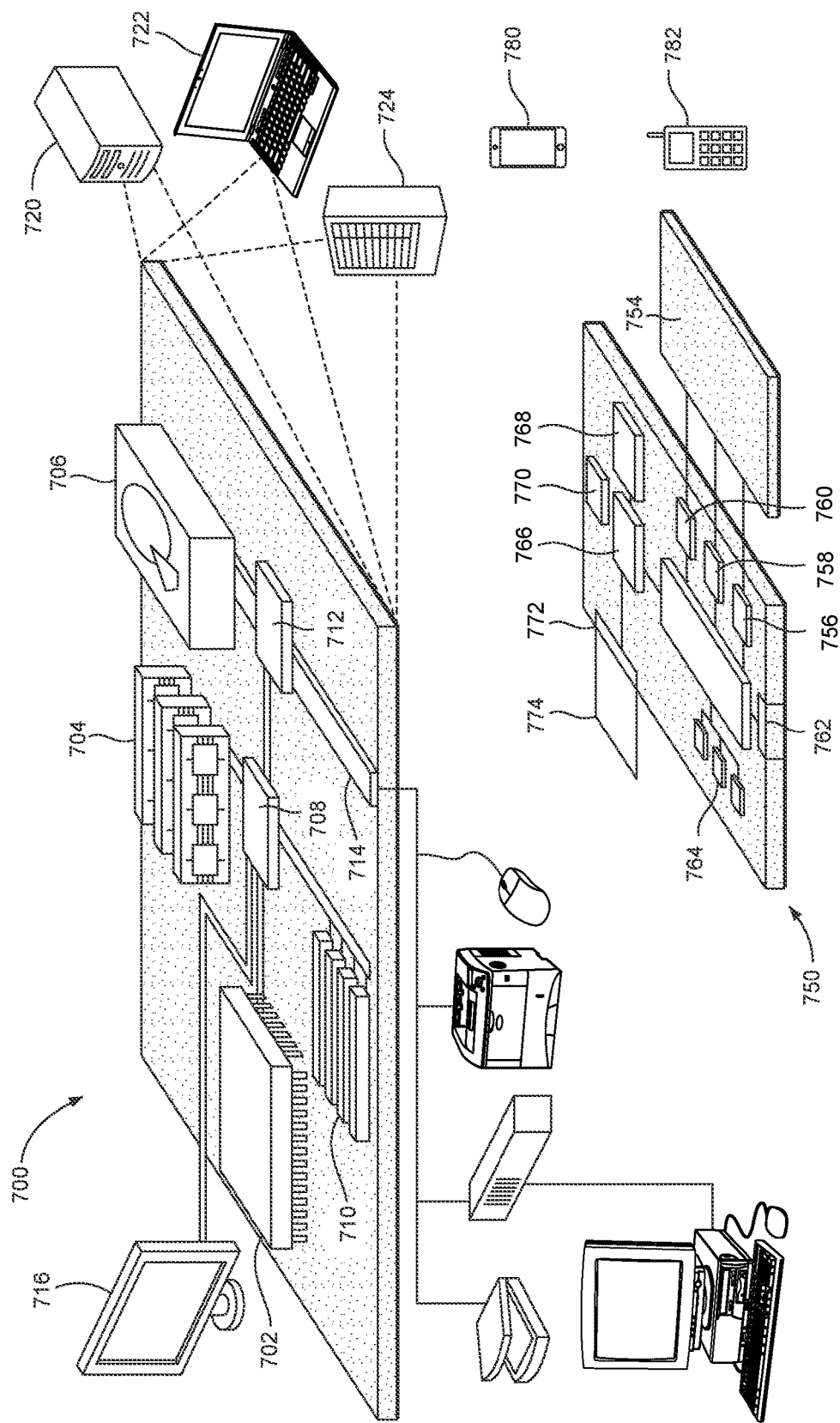
FIG. 7 is a schematic of a computing or mobile device, or server, such as one of the devices described above, according to one exemplary embodiment.

FIG. 7 is a schematic of a computing or mobile device or server, such as one of the devices described above, according to one exemplary embodiment. Computing device 700 is intended to represent various forms of digital computers, such as smartphones, tablets, kiosks, laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 700 includes a processor 702, memory 704, a storage device 706, a high-speed interface or controller 708 connecting to memory 704 and high-speed expansion ports 710, and a low-speed interface or controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., such as a server bank, a group of blade servers, or a multi-processor system).

The memory 704 stores information within the computing device 700. In one implementation, the memory 704 is one or more volatile memory units. In another implementation, the memory 704 is a non-volatile memory unit or units. The memory 704 may also be another form of computer-readable medium, such as a magnetic or optical disk.

The storage device 706 can provide mass storage for the computing device 700. In one implementation, the storage device 706 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In this implementation, low-speed controller 712 is coupled to storage device 706 and low-speed bus 714. The low-speed bus 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in several different forms. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750 or may also store applications or other information for device 750. Specifically, expansion memory 774 may include instructions to carry out or supplement the processes described above and may include secure information also. Thus, for example, expansion memory 774 may be provide as a security module for device 750 and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received for example, over a transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, a GPS (Global Positioning system) receiver module 770 may provide additional navigation- and location-related wireless data to device 750, which may be used, as appropriate, by applications running on device 750.

Device 750 may also communicate audibly using audio codec 760, which may receive spoken information from a user and convert it to usable digital information, such as with speech recognition capability from a digital representation of an analog output from the microphone. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by software applications operating on device 750.

The computing device 750 may be implemented in several different forms, as shown in the figure. For example, it may be implemented as a cellular telephone 782. It may also be implemented as part of a smart phone 780, personal digital assistant, a computer tablet, computer, laptop, smart speakers, television, mechanical arm, or other similar mobile device.

Thus, various implementations of the systems and techniques described herein can be realized in digital electronic circuitry, integrated circuitry, especially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium", "machine executable code" or "computer-readable medium" refers to any computer program product, apparatus and/or device (e.g., optical disks, flash drives, magnetic discs, optical disks, memory, Programmable Logic Devices (PLDs)) used to provide machine instructions and/or data to a processor, including a machine-readable medium that receives machine instructions as a machine-readable signal. The term "machine-readable signal" refers to any signal used to provide machine instructions and/or data to a programmable processor. These signals may be non-transitory or transitory.

To provide for interaction with a user, the systems and techniques described here can be implemented on a computer having a display device such as a LCD (liquid crystal display monitor), a LED (light emitting diode), or an OLED (organic light emitting diode), for displaying information to the user and a keyboard and a pointing device (e.g., a mouse, joystick, trackball, or similar device) by which the user can provide input to the computer. Other kinds of devices can be used to provide for interaction with a user as well. For example, feedback provided to the user may be any form of sensory feedback (e.g., visual feedback, auditory feedback, or tactile feedback) and input from the user can be received in any form, including acoustic, speech, or tactile input.

The systems and techniques described herein can be implemented in a computing system (e.g., computing device 700 and/or 750) that includes a back-end component (e.g., as a data server, slot accounting system, player tracking system, or similar), or includes a middleware component (e.g., an application server), or may even include a front-end component (e.g., a client computer having a graphical user interface, or a web browser through which a user can interact with an implementation of the systems and techniques described herein), or any combination of such back-end, middleware, or front-end components. The components of the system can be interconnected by any form or medium of digital data communication (e.g., a communication network). Examples of communication networks include LAN, WAN, and the Internet.

The computing system can include clients and servers. A client and server are generally remote from each other and typically interact through a communication network. The relationship of client and server arises by virtue of computer programs running on the respective computers and having a client-server relationship to each other.

Appendices A-E describe additional CFG rules and steps and processes for updating and refining the question templates and queries described above, and provide exemplary codes for the method and apparatus described herein.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

Below is a sample dataset MKQA-1 generated following usage trends from a commercial system. Four WikiData types are chosen: people, TV series, literary works, and movies. 133 distinct properties are extracted from these four domains: noun, noun-adposition, verb-noun, verb, adjective, adposition, adverb-noun, adverb-adposition, subordinating conjunction, noun-adjective, adverb, pronoun-verb, adjective-subordinating conjunction, and coordinating conjunction-verb. Properties (words that describe the data value of a statement, such as "color" for the data value "blue" and that end with "ID" (such as IMDB ID) are filtered out due to their abundance and unrelated nature, and entities that are missing a label are removed. Labels are the main name given to identify an entity (i.e. an item or a property). For example, the item with the item identifier Q7378 on WikiData has the English label "elephant". On average, each property has 8.46 labels per predicate for a combined total of 1019 property labels.

For each respective type (people, TV series, literary works, and movies), up to 5000 entities may be also sampled. Disregarding duplicates, there may be 17,452 unique entities. Notably, these entities may be denoted by their plain text format rather than a canonical ID value. This was chosen to allow for the model to learn unseen entities, which may push the task of entity resolution to a downstream search. As each entity may also contain alternate labels, there may be on average 1.99 labels per entity, for a total of 34,074 unique entity labels. This process may yield a training dataset of 100,000 samples.

Two different test datasets may be created using the same format, for a total of 5,000 TEST-EASY samples and 5,000 TEST-HARD samples. The TEST-EASY set may use an identical generation method as the training set except the entities may be sampled from a different source. The TEST-HARD dataset may include more complex queries generated from CFG products that may be of a greater depth than in the training set and may contain additional filler words. These samples may then be further processed with standard, open source augmentation tools to further fuzz the dataset. Textual similarity may be visualized with sentence embeddings (such as generated with Google's Universal Sentence Encoder) through Tensorflow Projector https://projector.tensorflow.org. For example, the train dataset may contain the query: "Is the language of the original work of Spartacus the writing languages of Jeet's composer?" Further, it may be seen that its nearest neighbors are interested in comparing the language of one entity to the writing languages of another.

Several additional sample questions and similarities are summarized below:

| Sample Question | Cosine Similarity |
|---|---|
| Is Dietrich Haarer's language of expression the writing languages of the screenwriter of Spartacus? | 0.252 |
| Is the language of the original work of Sun Also Rises the writing languages of the composer of Monsters? | 0.307 |
| Was the language of the original work of Just Shoot Me! the writing languages of José Ramos-Horta? | 0.311 |
| Is the language of the original work of Brothers the writing languages of The Trial of Lucullus's author? | 0.323 |
| Is Beckmann's language of the original work the writing languages of the characters of Hombres de honor? | 0.324 |

To evaluate the applicability of the dataset, a baseline of a simple encoder-decoder based BART model [14] fine-tuned using NVIDIA/NeMo may be provided. Modeling the task as machine translation from natural language to SPARQL, using BART to initialize the weights of the network makes sense given its pre-training on the task of de-noising inputs.

With a learning rate of 4e-5, the model may converge within 5 epochs. Generation may be performed with greedy search, although a well configured beam search may likely improve performance. Results may then be passed through minor post-processing to clean up spacing. In this example, no other hyperparameters are adjusted, and no other model architectures are evaluated. Instead, these findings may be presented as validation of utilizing a generated dataset for the KGQA task.

For evaluation, BLEU [15] and ROUGE [16] may be good indicators of the model's performances. BART performs nearly flawless on the easy test set. For the hard set, an expected decrease in scores as the model is challenged with more complex logical requirements, noisy perturbations, and additional unseen slot domains is observed.

| Dataset | BLEU | ROUGE-1 | ROUGE-2 | ROUGE-L | ROUGE-W |
|---|---|---|---|---|---|
| TEST-EASY | 0.98841 | 0.99581 | 0.99167 | 0.99581 | 0.71521 |
| TEST-HARD | 0.59669 | 0.78746 | 0.73099 | 0.78164 | 0.48497 |

The automatic question/query pair generating system may be expanded in various ways. For example, expansion to new domains within the same knowledge base may occur easily since the vast majority of the pipeline may be automated. Expansion to new question types may be achieved using additional baseline template CFG rules, predicate numbering functions, and/or slightly modified question and query constructor modules. Expansion to different natural languages will vary from language to language, with some requiring only the modification of the baseline template CFG rules. More context-dependent languages may see a decrease in the quality of the queries.

The automatic question/query pair generating system may be used to generate datasets to train any model for translating from English questions to SPARQL queries and/or vice versa. This may be helpful for deciphering SPARQL queries into English or other languages for the sake of readability, and may be used in any software programs that utilize such features.

While the automatically generated question/query pair dataset under the current invented system may serve well for the task of text2sparql, such dataset is not fully suitable for systems that provide text that is originally from voice input. There are types of errors that can occur in speech to text transcription that may cause serious semantic errors and jeopardize the model's ability to translate. Recent work in Telephonetic Augmentation suggests that augmenting the dataset with these types of errors can yield substantial improvement when the model is fed voice input. This augmentation module may be added to the automatic question/query pair generation system at a later date.

What is claimed is:

1. A method for automatically generating question and query pair from a knowledge base comprising the steps of:
   accessing a knowledge base;
   extracting, via processing module stored in a memory and executed by a processor, one or more entities and one or more predicates from said knowledge base;
   generating, via a baseline template generator module, a baseline question template from a context free grammar rule;
   inputting the one or more entities and the one or more predicates into the baseline question template to determine a numbering of the one or more predicates;
   generating a numbered question template based on the numbering;
   generating a typed question template by traversing the numbered question template through a predicate type-graph;
   generating a protocol and RDF query language (SPARQL) query by inputting the one or more entities and the one or more predicates into a SPARQL query template;
   generating a question by inputting the one or more entities and the one or more predicates into the typed question template;
   constructing a question and query pair by combining the question and the SPARQL query; and
   storing the question and query pair in the memory for future access.

2. The method of claim 1 wherein the knowledge base is an open knowledge base.

3. The method of claim 2 wherein the open knowledge base is WikiData.

4. The method of claim 1 wherein the SPARQL query comprises one or more of the following types: single-entity, multi-entity, count, two intention, ranking, and filtering.

5. The method of claim 1 wherein the predicate-type graph comprises at least two predicates connected by an edge.

6. The method of claim 5 wherein the edge may be uni-directional or bi-directional.

7. The method of claim 5 wherein the edge comprises of legal paths.

8. A system for automatically generating question and query pair from a knowledge base comprising:
   a memory, a processor, and non-transitory machine readable code stored in the memory and executed by the processor, the non-transitory machine readable code comprising:
      a knowledge processing module configured to access a knowledge base and identify an entity and two predicates from the knowledge base;
      a baseline template generator configured to receive input of a context free grammar rule and to generate a baseline question template based on the input of the context free grammar rule;
      a numbering module configured to number the two predicates, and to generate a numbered question template based on the baseline question template and the numbering of the two predicates;
      a traverse predicate module configured to traverse the numbered question template through a predicate type-graph and to generate a typed question template based on the traverse;
      a protocol and RDF query language (SPARQL) query module configured to generate a SPARQL query based on input of the entity and the predicate; and
      a question and query constructor module configured to generate a question based on input of the entity and the predicate to the typed question template, and to generate a question and query pair using the question and the SPARQL query to then store the question and query pair in the memory for future lookup.

9. The system of claim 8 wherein the memory is stored in, and the processor operates on, one or more of the following: a user device, a server, a cloud.

10. The system of claim 8 wherein the numbering comprises appending a nesting order to the two predicates.

11. The system of claim 10 wherein the SPARQL query module uses the same nesting order.

12. The system of claim 8 wherein the knowledge processing module configured to identify two entities, and the numbering module is further configured to number the two entities.

13. The system of claim 8 further comprising a database comprising of one or more question and query pairs.

14. A system to automatically generate questions comprising:
   a memory, a processor, and non-transitory machine readable code stored in the memory and executed by the processor, the non-transitory machine readable code comprising:
      a baseline template generator configured generate a baseline question template from a context free grammar rule;
      a numbering module configured to input one or more entities and one or more predicates, append a nesting order to the one or more predicates, and to generate a numbered question template based on the baseline question template and the nesting order;
      a traverse predicate module configured to generate a typed question template based on the traverse of the numbered question template through a predicate type-graph; and
      a question constructor module configured to generate a question based the predicate to the typed question template, the one or more entities, and the one or more predicates;
      wherein the generated question is stored in the memory.

15. The system of claim 14 wherein the one or more entities and the one or more predicates are identified from a knowledge base.

16. The system of claim 14 wherein the predicate type-graph comprises two nodes and one edge, the node comprising a predicate, and the edge comprising the ontological type of the predicate.

17. The system of claim 16 wherein the predicate type-graph comprises a first edge and a second edge, and wherein each node is treated as a function from the first edge to the second edge, or from the second edge to the first edge.

18. The system of claim 16 wherein the edge is directional or bi-directional.

* * * * *